United States Patent [19]
Ohara

[11] Patent Number: 5,432,354
[45] Date of Patent: Jul. 11, 1995

[54] RADIOGRAPHIC IMAGE READING APPARATUS

[75] Inventor: Hiromu Ohara, Hachioji, Japan
[73] Assignee: Konica Corporation, Japan
[21] Appl. No.: 341,272
[22] Filed: Nov. 17, 1994

Related U.S. Application Data

[63] Continuation of Ser. No. 984,340, Dec. 2, 1992, abandoned.

[30] Foreign Application Priority Data

Dec. 4, 1991 [JP] Japan .................................. 3-320568

[51] Int. Cl.⁶ .............................................. G03B 42/00
[52] U.S. Cl. .................................. 250/582; 250/484.4; 250/584
[58] Field of Search ................. 250/484.4, 582, 584

[56] References Cited

U.S. PATENT DOCUMENTS

| | | | |
|---|---|---|---|
| Re. 31,847 | 3/1985 | Luckey | 250/581 |
| 4,788,434 | 11/1988 | Takahashi et al. | 250/484.4 |
| 4,825,085 | 4/1989 | Tsuchino et al. | 250/484.4 |
| 4,931,643 | 6/1990 | Amtmann | 250/583 |

FOREIGN PATENT DOCUMENTS

| | | | |
|---|---|---|---|
| 53-165842 | 7/1988 | Japan | 250/484.4 |

*Primary Examiner*—Constantine Hannaher
*Attorney, Agent, or Firm*—Jordan B. Bierman; Bierman and Muserlian

[57] ABSTRACT

An apparatus for recording and reading a radiographic image formed by exposing a subject with radioactive rays includes a cooling device to cool a photostimulable phosphor containing iodine to a range of 250K to 300K. The cooled photostimulable phosphor is irradiated with radioactive rays so that radiographic energies corresponding to said radioactive rays are stored on the cooled photostimulable phosphor. The cooled photostimulable phosphor is stimulated with an exciting light so as to emit lights corresponding to the stored radiographic energies.

21 Claims, 13 Drawing Sheets

RADIOGRAPHIC IMAGE READING APPARATUS

This application is a continuation of application Ser. No. 07/984,340, filed Dec. 2, 1992, now abandoned.

BACKGROUND OF THE INVENTION

The present invention relates to a method for reading radiographic image information which is accumulated and stored in a radiographic image conversion panel having a photostimulable phosphor, and specifically to an efficient reading apparatus for radiographic image information.

A radiographic image such as an X-ray image is widely used for medical purposes. As a method to obtain the radiographic image, a radiographic method is used in which a fluorescent substance layer (fluorescent screen) is irradiated with radioactive rays passed through a subject, visible light is generated thereby, and a silver salt photosensitive material is irradiated with the visible light and developed like an ordinary photographing method. However, recently, a method has been invented in which the radiographic image information is obtained without using a radiographic film made of a silver salt photosensitive material. In this method, radioactive rays which have passed through a subject are absorbed into some kind of a fluorescent substance, then the fluorescent substance is excited by, for example, light or heat energy, thereby radiographic ray energy which is accumulated in the fluorescent substance by the foregoing absorption is irradiated as a fluorescent light, and the fluorescent light is detected, so that the image can be formed. Specifically, this method is disclosed in, for example, U.S. Pat. No. 3,859,527, or Japanese Patent Specification Open to Public Inspection No. 12144/1980. In these specifications, a photostimulable phosphor is used, and a radiographic image conversion method in which visible light or infrared rays are used as excitation light, is disclosed as follows. A radiographic image conversion panel is used in which a photostimulable phosphor layer is formed on a support; the photostimulable phosphor layer is irradiated with the radioactive rays which have passed through a subject, and radiographic ray energy corresponding to radiographic ray transmittance of each portion of the subject is accumulated to form a latent image; then, the photostimulable phosphor layer is scanned by the foregoing stimulation excitation light, and thereby the radiographic ray energy which is accumulated in each portion of the radiographic image conversion panel is radiated and converted into light; and a light signal according to the intensity of the light is detected by a photoelectric conversion element such as a photo-multiplier, a photodiode, or the like so that radiographic image information can be obtained.

The radiographic image information thus obtained is not further processed, or image-processed when spatial frequency processing or gradation processing is conducted in a real time, and is outputted onto a silver salt film or a CRT to be visualized, or stored in an image memory such as a semiconductor memory, a magnetic memory, an optical disc memory or the like, and after that, it is read out as necessary from these image memories and outputted onto a silver salt film or a CRT to be visualized.

According to the foregoing radiographic image conversion method, a radiographic image having a lot of informations can be obtained by a smaller radiographic ray exposure amount than that by a conventional radiographic method. Accordingly, the radiographic image conversion method is extremely useful for direct radiographing such as X-ray radiographing which is used particularly for medical diagnosis.

Figure 1:
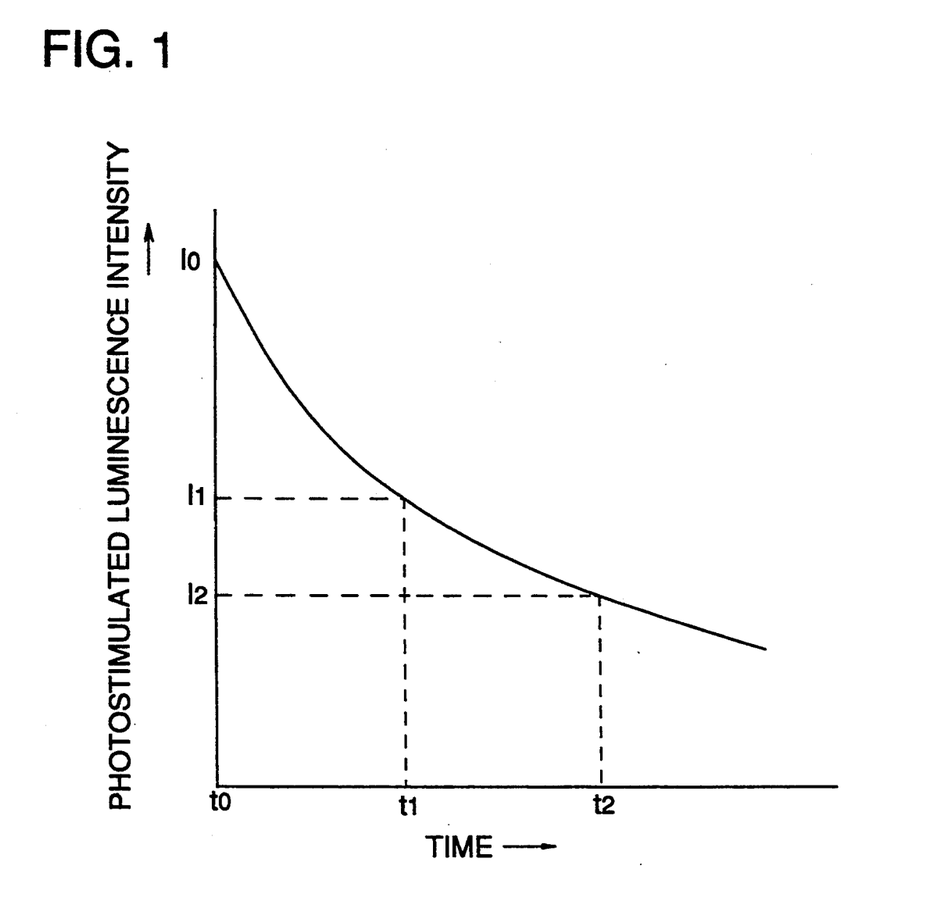
FIG. 1 shows the decay of an image signal (for example, the photosimulated luminescence (PSL) intensity) of a photostimulable phosphor.

However, the foregoing method has a problem in which radiographic ray energy, which is stored in a radiographic image information recording medium by radiographic ray radiation, is largely decreased as time goes by. (This phenomenon is called "fading".) Therefore, as shown in FIG. 1, the intensity of the image signal is lowered as time passes from a time $(t_0)$ at which the image has been irradiated by a radioactive ray, to a time $(t_1I)$ at which the radiographic image is read out by excitation light, or to a time $(t_2)$ at which the radiographic image has been read out. Here, $(I_0I_1)/I_0$ will be referred to as a fading value, where $I_0$ is the signal intensity of the image signal at a time $t_0$ at which the image has been irradiated, and $I_1$ is the signal intensity at time $t_1$.

That is, as time elapses from the time $(t_0)$ to the time $(t_1)$ from which radiographic image reading is started, the intensity of the image signal is lowered, and thereby a ratio of signal (S)/noise (N) is lowered, so that image quality of the radiographic image obtained as above is deteriorated. Further, as time elapses from the time $(t_0)$ to the time $(t_2)$ at which the image reading has been completed, the intensity of the obtained image signal is lowered, and thereby a difference between the magnitude of the image signal obtained at the start of reading and that of the image signal obtained at the completion of reading is caused, so that a uniform image can not be obtained.

To cope with this problem, a reading apparatus in which CsI:Na is used as a fluorescent substance layer and is maintained under the temperature of 180K is disclosed in (1) Japanese Patent Publication Open to Public Inspection No. 123829/1986.

Further, a reading apparatus in which the fluorescent substance layer is maintained under the temperature of 250K to 300K is disclosed in (2) Japanese Patent Publication Open to Public Inspection No. 180941/1988.

However, in the method (1) described above, a large cooling apparatus is necessary since the cooling temperature is extremely low, and thereby the reading apparatus becomes large and complicated.

Further, in the method (2), although it is described that fading is small in the practical low temperature region, the photostimulable phosphor which is used in this reading apparatus is only generally described in the publication, and only RbBr:Tl is disclosed as a specific example of the fluorescent substance with a superior property.

In view of the foregoing, the object of the present invention is to provide a radiographic image reading apparatus in which fading of a signal read out from an energy image accumulated in a radiographic image recording medium, is satisfactorily small in a practicable low temperature region, and a radiographic image of good quality can be obtained.

SUMMARY OF THE INVENTION

Further, the object of the present invention is to provide a radiographic image reading apparatus in which the reading out sensitivity of a signal read out from an energy image accumulated in a radiographic image recording medium is sufficiently high in a practicable low temperature region, and a radiographic image of good quality can be obtained.

The radiographic image reading apparatus according to the present invention in which a radiographic image conversion panel (hereinafter called a conversion panel) having thereon a photostimulable phosphor layer which emits stimulated radiation light is irradiated by radioactive rays so that the radiographic image information is accumulated and recorded in the conversion panel, and then, stimulation excitation light is irradiated on the conversion panel so that radiographic image information accumulated and recorded in the conversion panel can be obtained, the radiographic image reading apparatus (called a reading apparatus, hereinafter) is characterized in that: the stimulation fluorescent substance includes iodine; and the reading apparatus comprises a means for cooling the conversion panel to a temperature of 250K to 300K.

Figure 7:
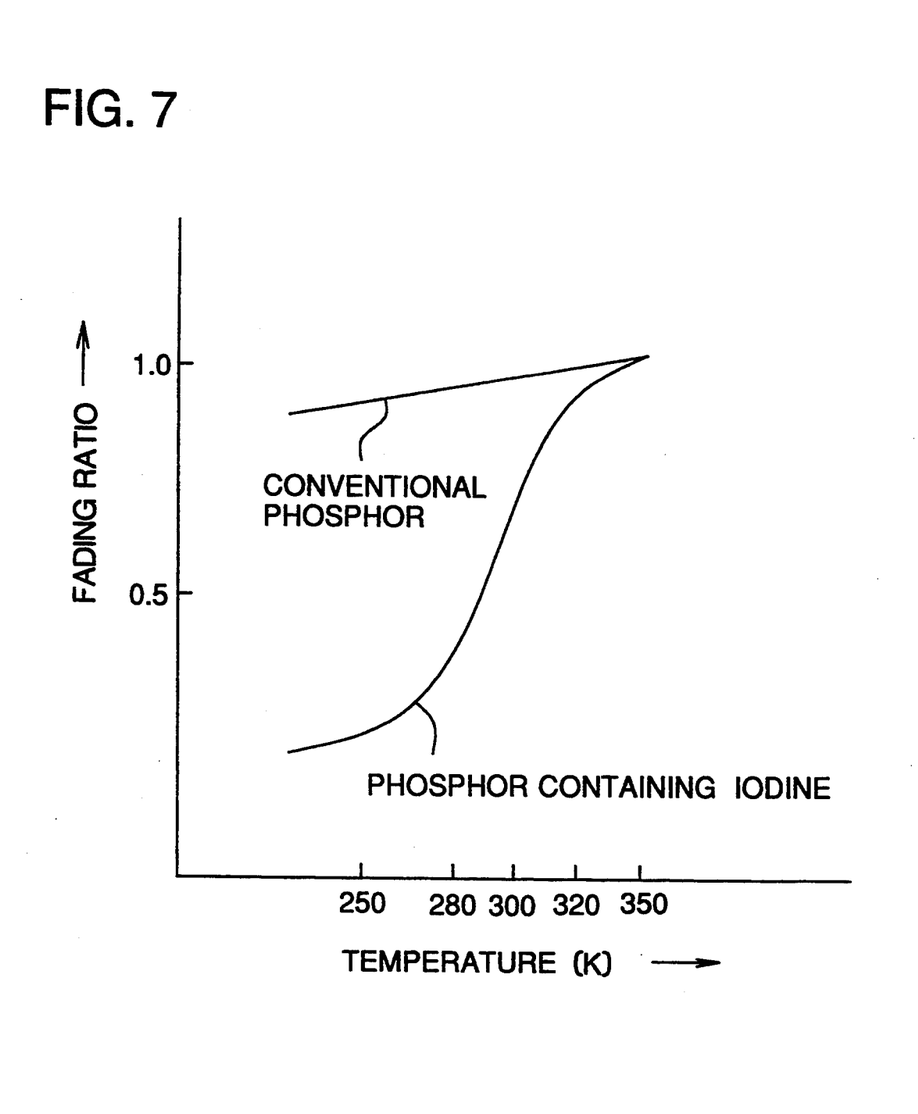
FIG. 7 is a general view showing a temperature dependent property of a fading ratio of a fluorescent substance.

According to the present invention, a photostimulable phosphor, (called a fluorescent substance, hereinafter), which is characterized by the inclusion of iodine is cooled to a temperature of 250K to 300K, and radioactive rays such as X-rays, ultraviolet rays, or electronic rays are irradiated onto the fluorescent substance, and after that, stimulation excitation light is irradiated onto the fluorescent substance and the substance is excited thereby, so that fading of stimulated radiation light can be maintained at a sufficiently small value. Further, when the temperature is decreased, fading is suddenly lowered to a small value at the temperature of 320 to 290K as shown in FIG. 7, and is maintained within a sufficiently small value, which is almost constant, below the temperature of 280K. That is, when the fluorescent substance is cooled to the temperature of 250 to 300K, a sufficiently small fading value can be obtained, and since it is not necessary to cool the fluorescent substance to an extremely low temperature, below the above value, the reading apparatus can be made small.

In addition to the above effects, sufficiently high sensitivity can be obtained in a low temperature range, which is several times as high as that obtained at room temperature.

Further, the cooling temperature is 250 to 300K, which is close to room temperature, and thereby, the apparatus can be prevented from being large and complicated, and the temperature can be easily controlled.

DETAILED DESCRIPTION OF THE PREFERRED EMBODIMENT

Referring to the drawings, an embodiment of the present invention will be described as follows.

Figure 2:
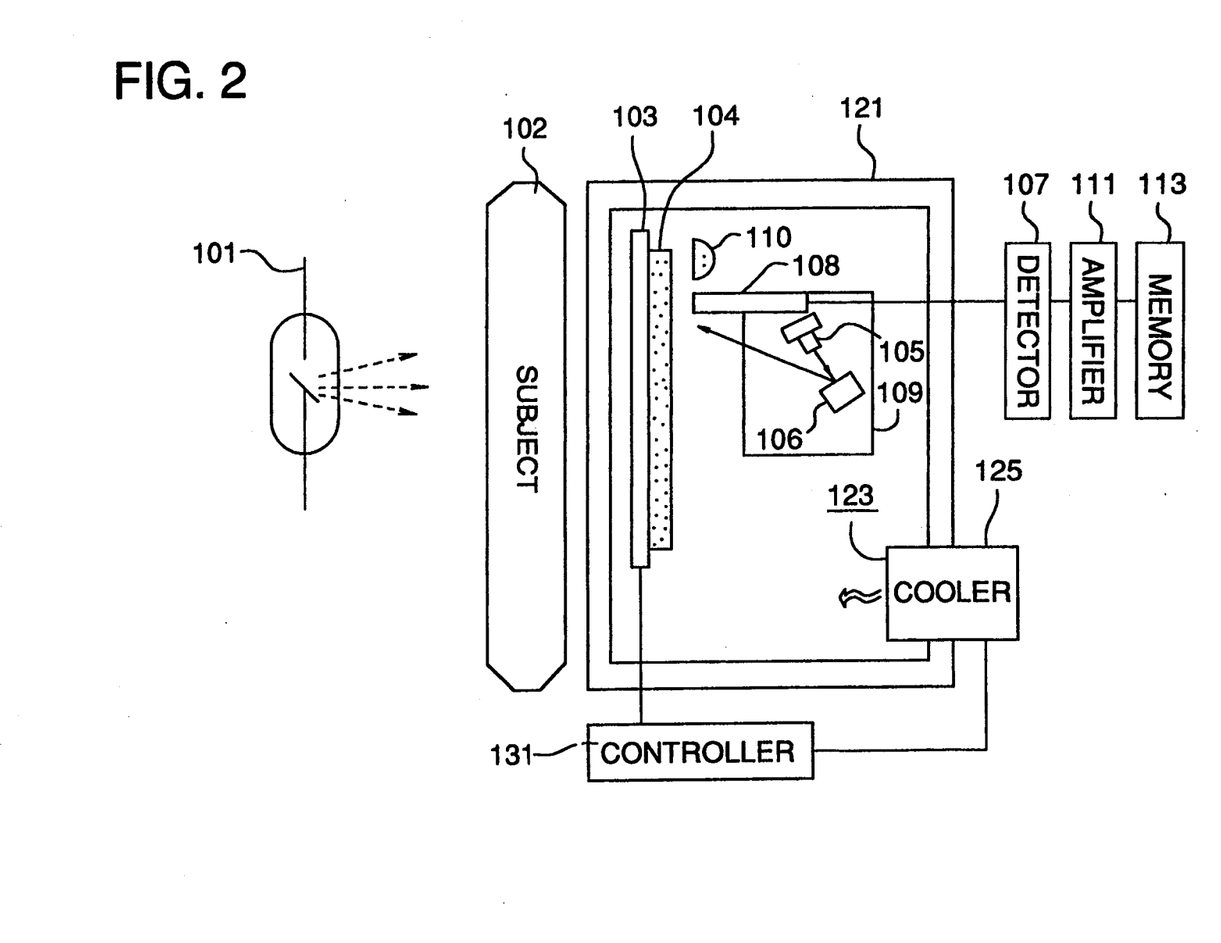
FIG. 2 is a view showing a general structure of an example of the radiographic image reading apparatus according to the present invention.

FIG. 2 is a general view showing an example of a reading apparatus of the present invention, in which an image recording unit is integrated with an image reading unit.

After a subject 102 is positioned between a conversion panel 103 and a radiation source 101, when the radiation source is turned ON, a radiographic image, which is obtained by radiation transmitted through the subject 102, is recorded and accumulated in a fluorescent substance 104 on the conversion panel 103. Then, the conversion panel 103 is scanned by a stimulation excitation light source 105, such as a laser, and then, the stimulated radiation radiated from the fluorescent substance 104 is detected by a photo detector 107 through a light transmission means 108. At this time, a carrier stage 109 subsidiarily scans the conversion panel from, for example, an upper portion to a lower portion thereof, and detects the stimulated radiation of the entire conversion panel 103. An electric signal of the stimulated radiation in time series is amplified by an amplifier 111 and fed to a memory means 113. A light source 110 for elimination is provided in the position facing the surface of the fluorescent substance side of the conversion panel 103, detects the stimulated radiation, and after that, eliminates the latent image accumulated in the fluorescent substance.

Figure 3:
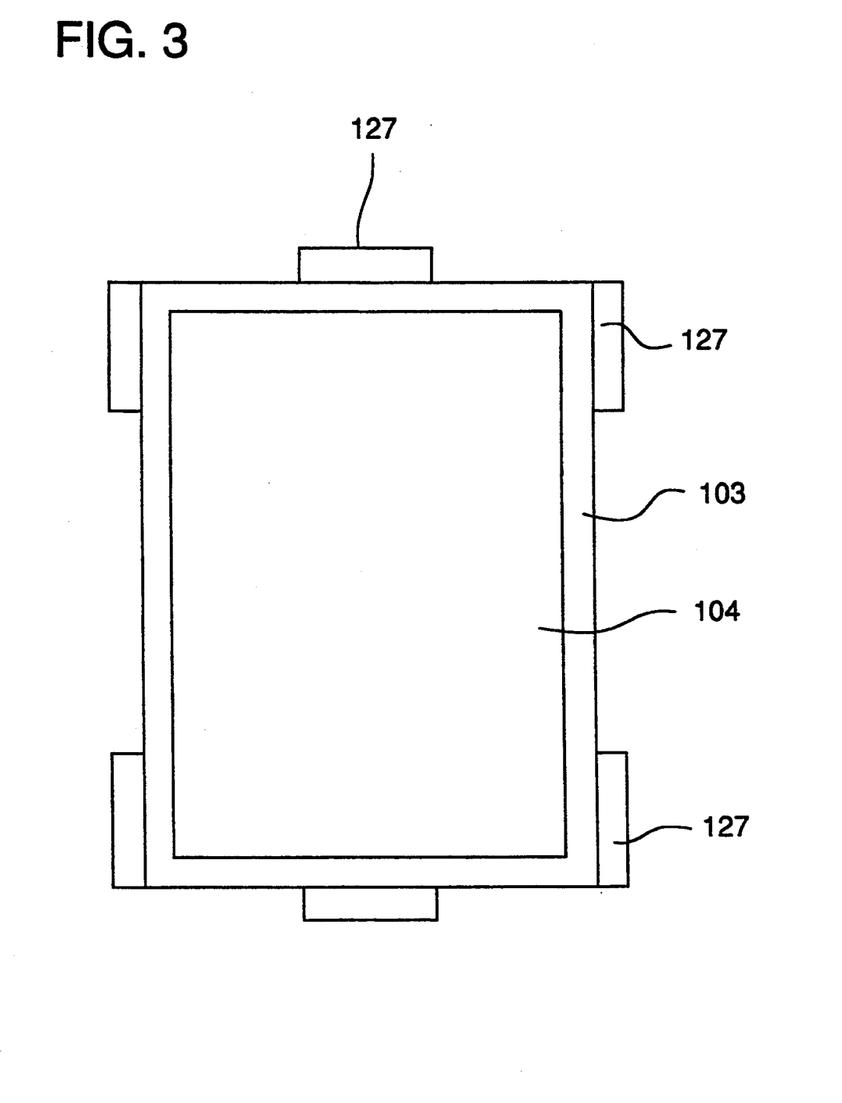
FIG. 3 is a view showing a general structure of a representative example of a cooling means.

The image recording unit and the image reading unit are covered with a housing 121, thermally insulated from the outside of the apparatus, and are provided with a cooling means 123 by which the conversion panel 103 is cooled. In the drawing, this cooling means is represented by numeral 123, which includes a cooling device 125, and cooled air is supplied by the cooling device 125 provided outside the apparatus into the housing 121, which is cooled by the cooled air. In this case, when the cooled air directly blows against the conversion panel 103, the temperature of the blown portion becomes lower than that of other portions on the conversion panel, and thereby, it becomes difficult to maintain the temperature of the conversion panel to be uniform. Therefore, it is preferable to make the cooled air blow against the conversion panel indirectly, or to make the cooled air blow against the conversion panel uniformly. A cooling device in which a heat exchange medium such as cooled water is used, or a compression type cooling device may be preferably used for the cooling device 125. The following methods can be adopted as the cooling method for the housing 121: a cooling method by which the conversion panel is cooled by arranging cooling elements 127 around the conversion panel 103 as shown in FIG. 3; a method by which the conversion panel is cooled after the air in the housing is cooled by a compression type cooling device provided outside the housing; a method by which the housing is filled with inert gas such as He, Ne, or Ar, or other dried low temperature gas such as $N_2$; or a combination of the above-described cooling methods. Further, it is preferable that the air, cooled by the above-described methods, in the apparatus is not exhausted to the outside of the apparatus, and circulates in the apparatus. Even when the above-described apparatuses or other apparatuses are adopted as the cooling means 123, the temperature of the conversion panel must be maintained within 250 to 300K. Further, it is more preferable that the temperature of the conversion panel is maintained within 270 to 300K.

Since the fluorescent substance including iodine is used for the conversion panel 103 as described above, the intensity of the stimulated radiation is very high. Since the temperature of the conversion panel is cooled within the range of 250 to 300K, fading of the stimulation irradiation intensity can be suppressed, and signals can be easily corrected. Further, as another effect, the exposure dose of the subject 102 can be decreased because the amount of readout signal is increased.

Figure 4:
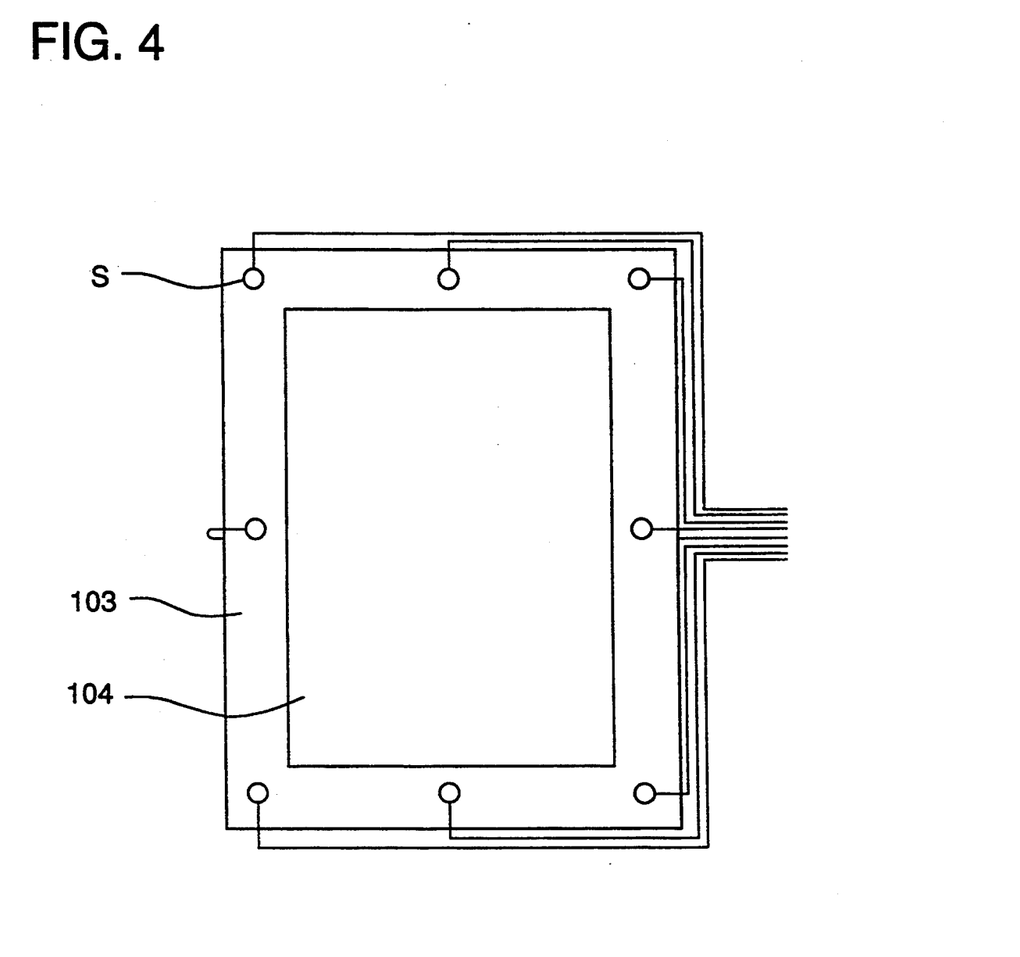
FIG. 4 is a view showing a general structure of a representative example of a temperature measuring means for a radiographic conversion panel.

The above-described apparatus must have a temperature control means 131 by which the temperature of the conversion panel 103 is maintained to be constant and the temperature on the surface of the panel is made uniform. For example, as shown in FIG. 4, there is a method in which means S, which can measure the temperature, are provided in several portions on the conversion panel 103, and by which the temperature is measured, the measured data is sent to the cooling means, and the temperature of the conversion panel is controlled based on the measured data. A change in the temperature of the conversion panel 103 depending on the lapse of time is preferably within $\pm 3°$ C. with respect to an average temperature when the temperature of one point on the conversion panel is observed after the temperature is stabilized, and is more preferably within $\pm 1°$ C. Dispersion of the temperature on the conversion panel 103 according to the position on the panel is preferably within $\pm 3°$ C. with respect to the average temperature of the panel, and more preferably within $\pm 1°$ C. The conversion panel 103 must be cooled before the radiographic ray is irradiated. It is preferable to radiograph the image and read out the image when the dispersion in the actual temperature of the conversion panel is within the dispersion in the setting temperature and the difference between temperatures on the conversion panel is within the dispersion. It is more preferable to radiograph and read out the image 10 to 20 minutes after the temperature has been controlled as described above.

The lower the temperature of the conversion panel 103, the better the anti-fading property. Therefore, it is considered that the temperature in the position in which reading-out is performed later is preferably made cooler than that of the formerly read out portion. According to this method, the difference between the magnitude of the signal value of the position on the conversion panel 103 in which the signal is read out just after the read-out operation has been started and that of the signal value of the position on the conversion panel in which the signal is read out later than the former case, becomes smaller, and thereby, a more uniform image can be obtained. Although in the foregoing example the cooled air does not directly blow against the conversion panel 103 so that the temperature of the conversion panel is more uniform, when the cooled air directly blows against the lower portion of the conversion panel (when the reading-out operation is started from the upper portion of the panel), the temperature of the lower portion of the conversion panel can be made lower. Even in the case where the cooled air does not directly blow against the lower portion of the conversion panel, when the cooled air indirectly blows against the lower portion of the panel 103, or when the conversion panel is cooled by the foregoing cooling method from the lower direction, the lower the position on the conversion panel is, the lower the temperature on the lower portion of the conversion panel becomes.

Figure 5A:
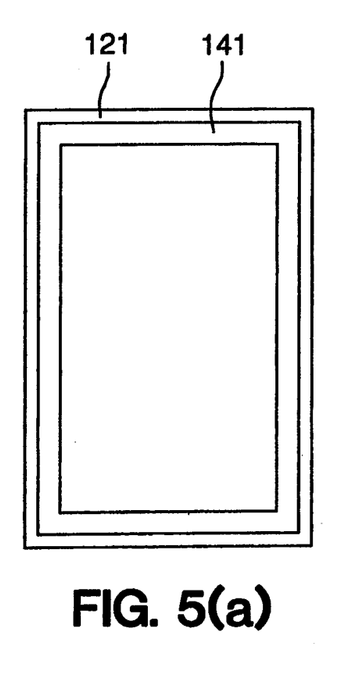
FIGS. 5(a) to 5(c) are views of representative examples in the case where heat insulating material is provided in the apparatus.
Figure 5B:
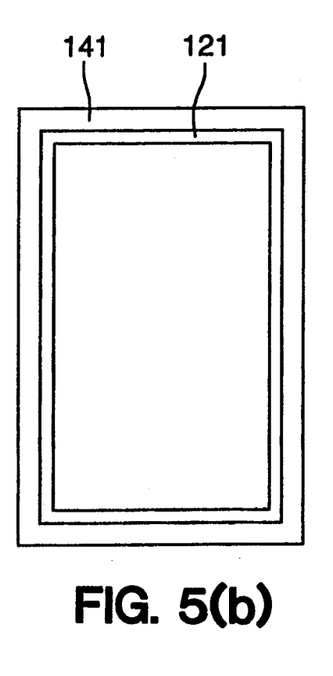
Figure 5C:
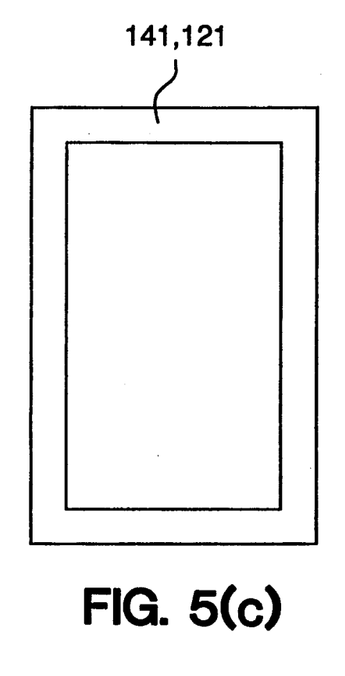

When the apparatus is cooled, in order to prevent condensation formation in the apparatus and on the outside of the apparatus, a condensation formation protection means must be provided on the housing 121. When air enters into the apparatus, it causes condensation formation in the apparatus. Therefore, the following methods are adopted: the pressure in the apparatus is increased higher than outside air pressure; the apparatus is hermetically shielded; the fully dried air is supplied into the apparatus; or a combination of the above methods. When the operation of the apparatus is stopped under the condition that the pressure in the apparatus is maintained to be high, it is necessary that the temperature in the apparatus is gradually increased to that of outside air, and that at this time, the pressure in the apparatus is maintained to be higher than that of the outside air. Other methods require the same conditions as that in the above case. That is, the above operation must be maintained while the temperature in the apparatus is increased to that of the outside air. The following methods may be adopted to prevent condensation formation on the outside the apparatus: the inside or the outside of the housing 121 is covered by a heat insulating material; or the housing is made of the insulating material. As the insulating material, for example, one of the following materials is used: polystyrene-foam, polyethylene-foam, hard polyvinyl chloride-foam, hard polyurethane-foam, urea-foam, and phenol-foam, which are organic insulating materials for which a natural material such as cork or the like or a synthetic organic material is used as a base material; and a fibrous material (asbestos, rock fiber, glass wool), a powder (basic magnesium carbonate, calcium silicate), a foam material (foam glass), a lightweight castable material, or an insulating firebrick, which are inorganic materials. FIGS. 5(a), 5(b) and 5(c) show typical examples of insulating materials used for the condensation formation protection means, and FIG. 5(a) shows an embodiment in which the inside of the housing is covered by the insulating material 141, FIG. 5(b) shows an embodiment in which the outside of the housing is covered by the insulating material, and FIG. 5(c) shows an embodiment in which the entire housing is covered by the insulating material.

Figure 6:
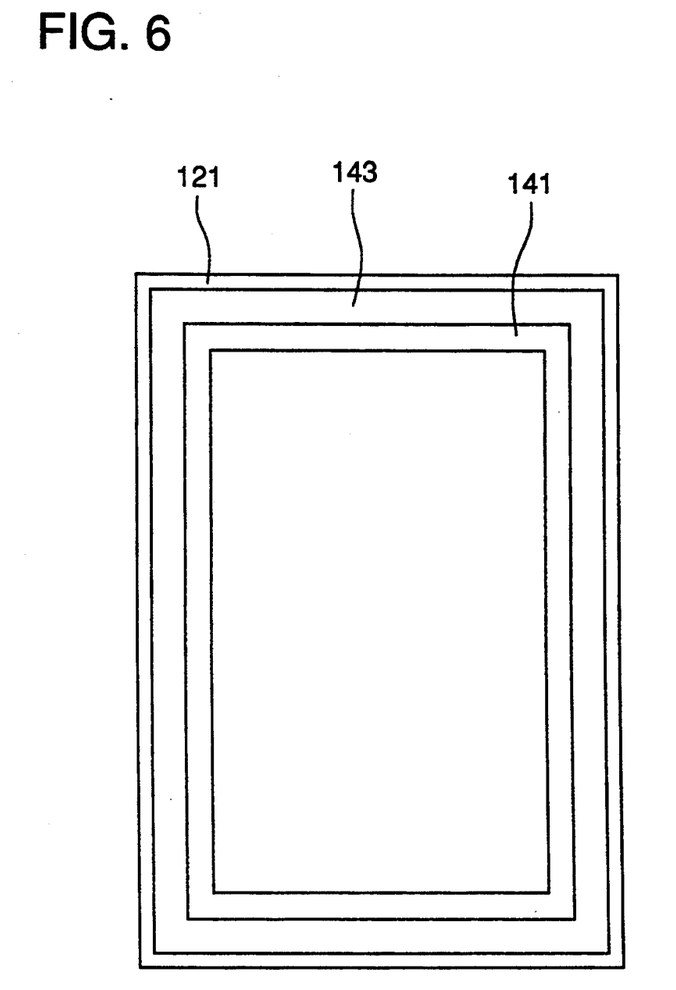
FIG. 6 is a view showing a general structure of an example in the case where a heater is provided in the apparatus.

Further, when the inside of the apparatus is covered by the insulating material, the housing 121 is preferably heated by a linear or plane heater so that the temperature of the housing is not decreased. For this, the heater by which a front plate facing the subject is heated must be made of a material in which the X-ray transmission rate is very high. FIG. 6 shows a typical example in which the above-described heater is provided, and the heater 143 is provided between the housing 121 and the insulating material 141. Further, a method in which an air layer is provided between the housing and the insulating material, is also considered.

The following can be used as the stimulation excitation light source 105: a He-Ne laser; a He-Cd laser; an Ar ion laser; a Kr ion laser; a $N_2$ laser; a YAG laser and its second harmonics; a ruby laser; a semiconductor laser; all kinds of dye lasers; and a metal vapor laser such as a copper vapor laser. It is preferable that the stimulation excitation light source is small, has high power, and properly matches with a stimulation excitation spectrum. It is preferable that when a portion which overlaps the stimulation excitation spectrum is included in the light emitted from the light source, a filter to cut the spectrum portion is used. Further, it is preferable that a filter, through which the stimulated radiation is transmitted, and by which the stimulation excitation light is cut, is used for a photoelectronic converter. It is preferable that the photoelectronic converter is used in which photoelectronic conversion sensitivity and transmission wavelength region are properly matched with the stimulation irradiation light.

A light source for elimination 110 is the light source by which light including the excitation wavelength region of the fluorescent substance is irradiated to the photostimulable phosphor 104, and the following light sources can be arbitrarily and selectively used for the light source: a halogen lamp; a tungsten lamp; an infrared lay lamp; and a LED or laser light source. In the present invention, since the housing 121 is cooled, it is preferable that the light source for elimination 110 emits as little heat as possible.

It is preferable for the embodiment of the present invention that the photostimulable phosphor is made of alkali metal halide which is expressed by the following general expression (1), or alkaline earth metal fluoride halides which is expressed by the following general expression (2).

General expression (1): $Rb.aM^1.bM^2.cM^3X_{1-x}I_x:dA$ $M^1$: at least one of the following alkali metals: Li, Na, K, Cs.

$M^2$: at least one of the following metals: Be, Mg, Ca, Sr, Ba, Zn, Cd, Cu, Ni.

$M^3$: at least one of the following metals: Sc, Y, La, Ce, Pr, Nd, Pm, Sm, Eu, Gd, Tb, Dy, Ho, Er, Tm, Yb, Lu, Al, Ga, In.

X: at least one of the following halides: F, Cl, Br.

A: at least one of the following metals: Eu, Tb, Ce, Tm, Dy, Pr, Ho, Nd, Yb, Er, Gd, Lu, Sm, Y, Tl, Na, Ag, Cu, Mg.

wherein:
$0 \leq a \leq 0.2$
$0 \leq b \leq 0.05$
$0 \leq c \leq 0.05$
$d \leq 0.1$ General expression (2): $Ba.aM^2FX_{1-x}I_x: dA$ $M^2$: at least one of the following metals: Mg, Ca, Sr, Zn, Cd.

X: at least one of the following halides: Cl, Br.

A: at least one of the following metals: Eu, Tb, Ce, Tm, Dy, Pr, Ho, Nd, Yb, Er, Sm, Gd.

wherein:
$0 \leq a \leq 0.5$
$d \leq 0.1$

It is preferable that the value of x in the general expressions is $0.5 \leq x \leq 1.0$, and more preferable that the value of X is $0.8 \leq x \leq 1.0$. This is due to the following reason: the more iodine is contained in the fluorescent substance, the higher the increasing ratio of sensitivity is when the temperature of the fluorescent substance is decreased. An addition amount of an additional active agent A is preferably in the range of the value which is generally known to be an additional activation amount of the additional active agent to the fluorescent substance, that is, the amount is preferably below $10^{-1}$ mols with respect to the amount of the host body, (1 mol), and more preferably, $10^{-6}$ to $10^{-2}$ mols.

Figure 8:
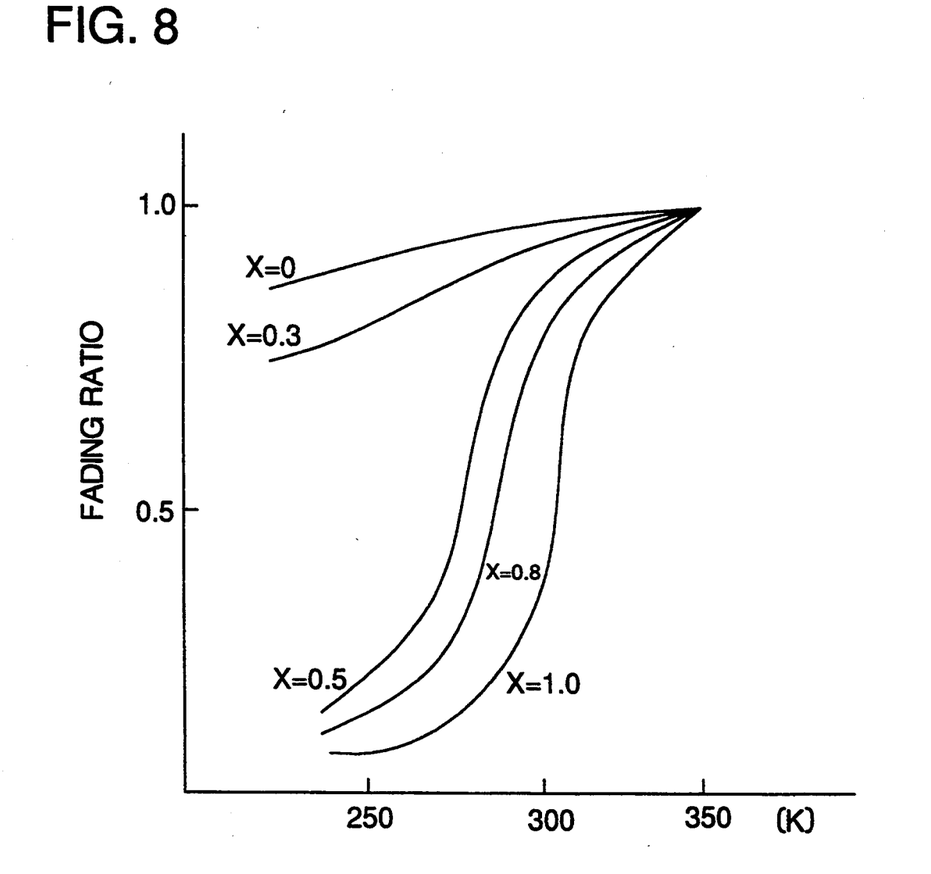
FIG. 8 is a view showing a relation between fading ratios of fluorescent substances having different iodine contents and temperatures (K) in the example of the present invention.
Figure 9:
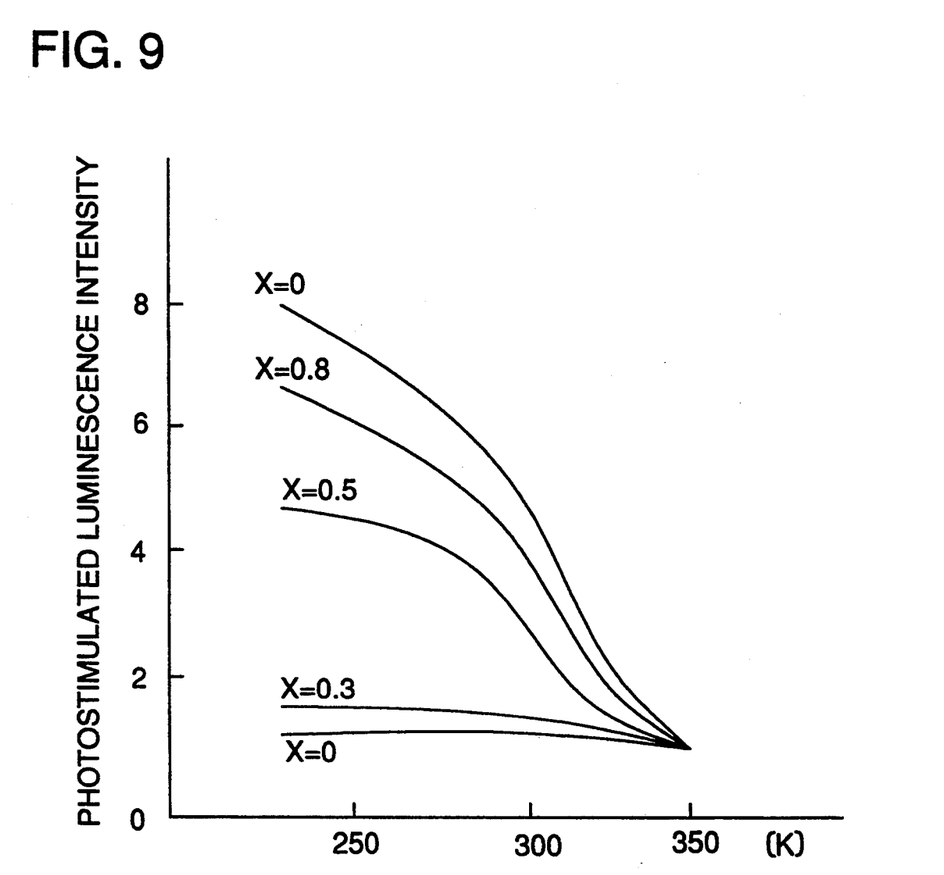
FIG. 9 is a view showing a relation between the PSL intensity of the fluorescent substances having different iodine contents and temperatures (K) in the example of the present invention.
Figure 10:
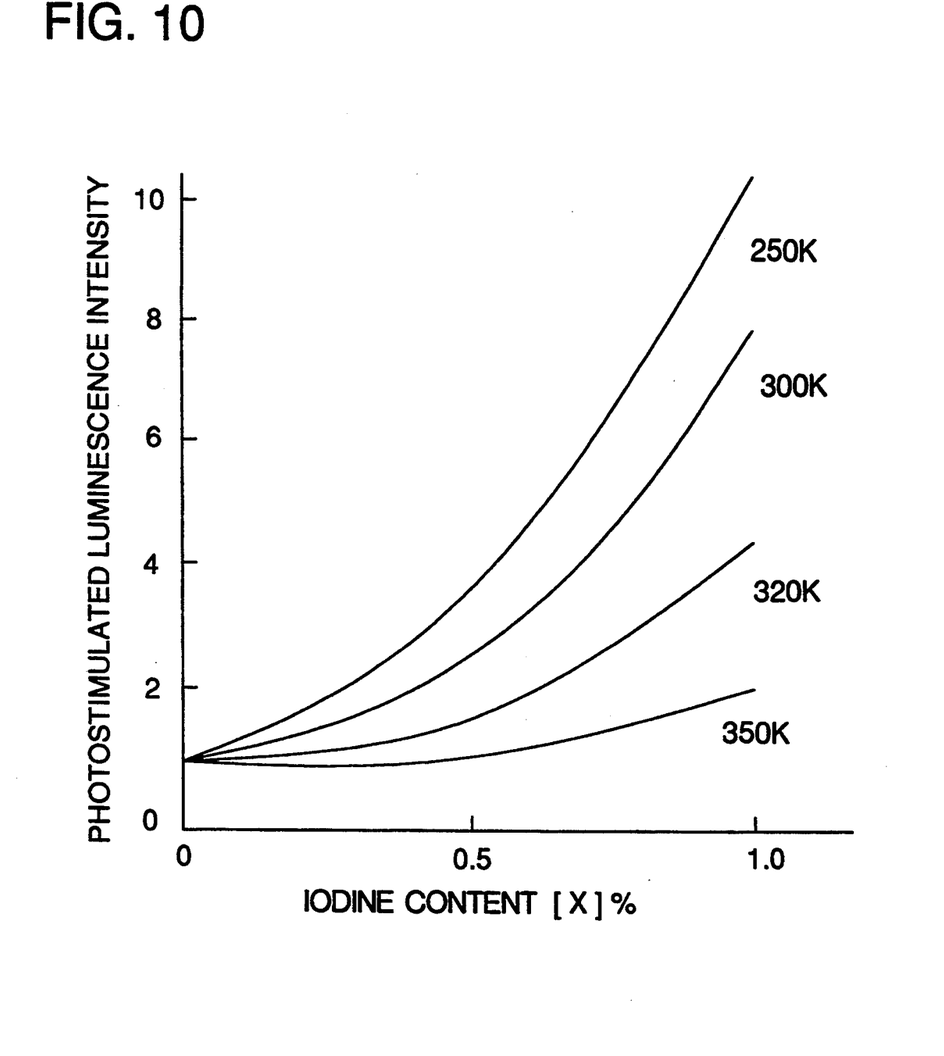
FIG. 10 is a view showing a relation between iodine contents of the fluorescent substances and the PSL intensity in different temperatures (K) in the example of the present invention.

The temperature of the conversion panel, which is made of the fluorescent substance expressed by $Rb\ Br_{1-x}I_x:5\times 10^{-4}\ Tl$ (X=0, 0.2, 0.5, 0.8, 1), is maintained at various temperatures, and the panel is irradiated with the radiographic ray. FIG. 8 to FIG. 10 show the results in which the ratios of fading caused when the stimulation excitation light is emitted to the panel after the above-described irradiation, and the intensity of the stimulation irradiation, are measured. FIG. 8 shows the result of measurement for the fading ratio, in which the value at the temperature of 350K is defined as 1. When $Rb\ Br_{0.7}I_{0.3}:Tl$ is used for the panel, the fading ratio is gradually decreased with the temperature. However, when the ratio of iodine is 0.5, that is, $Rb\ Br_{0.5}I_{0.5}:Tl$ is used for the panel, the fading value suddenly becomes smaller as the temperature decreases from the vicinity of 320K, and at the temperature of 280K, the value becomes 32% of that at the temperature of 350K. The larger the ratio of contained iodine is, the more the fading changing value is increased. Table 1 shows the fading ratios measured at the temperatures of 250, 300, and 350K when the values of X are 0, 0.3, 0.5, 0.8, and 1.0.

TABLE 1

| X | 250K | 300K | 350K |
|---|------|------|------|
| 0 | 0.90 | 0.96 | 1.0 |
| 0.3 | 0.72 | 0.91 | 1.0 |
| 0.5 | 0.22 | 0.77 | 1.0 |
| 0.8 | 0.15 | 0.68 | 1.0 |
| 1.0 | 0.06 | 0.29 | 1.0 |

FIG. 9 shows the temperature dependability of the stimulated radiation intensity. When $Rb\ Br_{0.7}I_{0.3}:Tl$ is used for the panel, the more the temperature is decreased, the larger the stimulated radiation intensity becomes. On the other hand, when $Rb\ Br_{0.5}I_{0.5}:Tl$ is used for the panel, the more the temperature is decreased, the larger the value becomes, and it is 3.8 times as large at 280K as that at 350K. The larger the iodine contained ratio is, the larger the change of the value is. FIG. 10 shows the iodine density dependability of the stimulated radiation intensity at the temperatures of 250, 300, 320, and 350K. When X exceeds 0.5 at the temperature below 300K, the stimulated radiation intensity suddenly becomes large.

Figure 11:
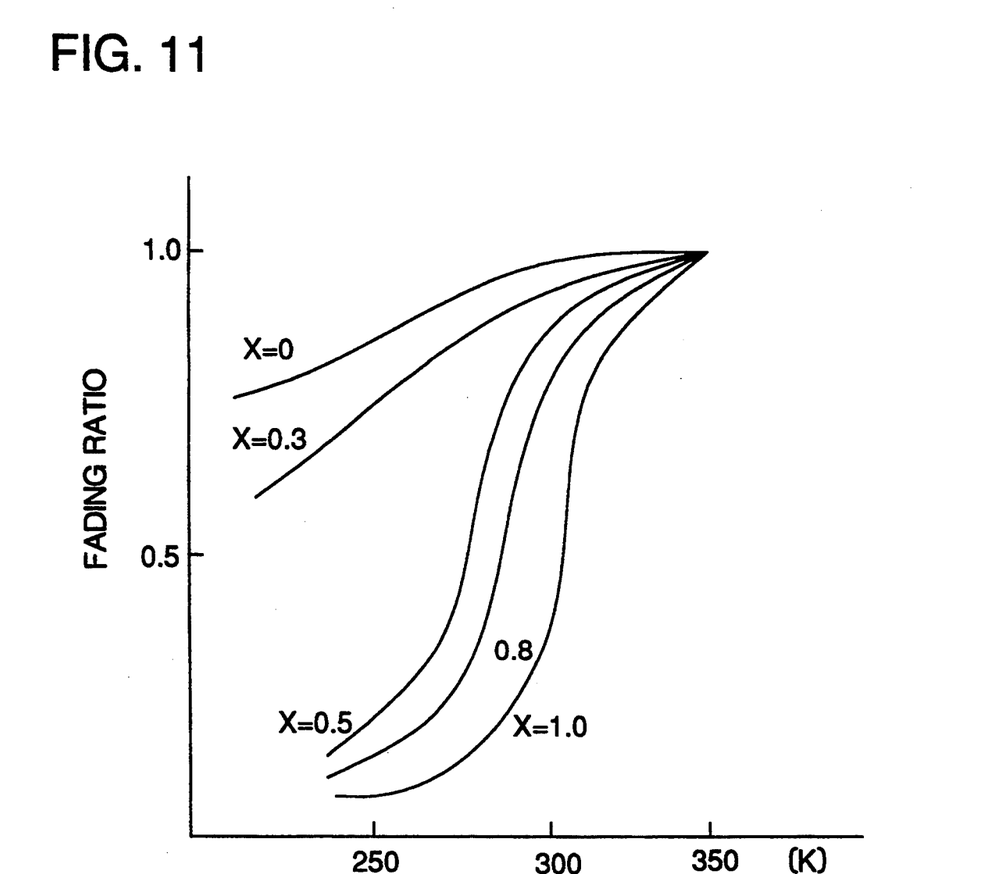
FIG. 11 is a view showing a relation between fading ratios of the fluorescent substances having different iodine contents and temperatures (K) in the example of the present invention.
Figure 12:
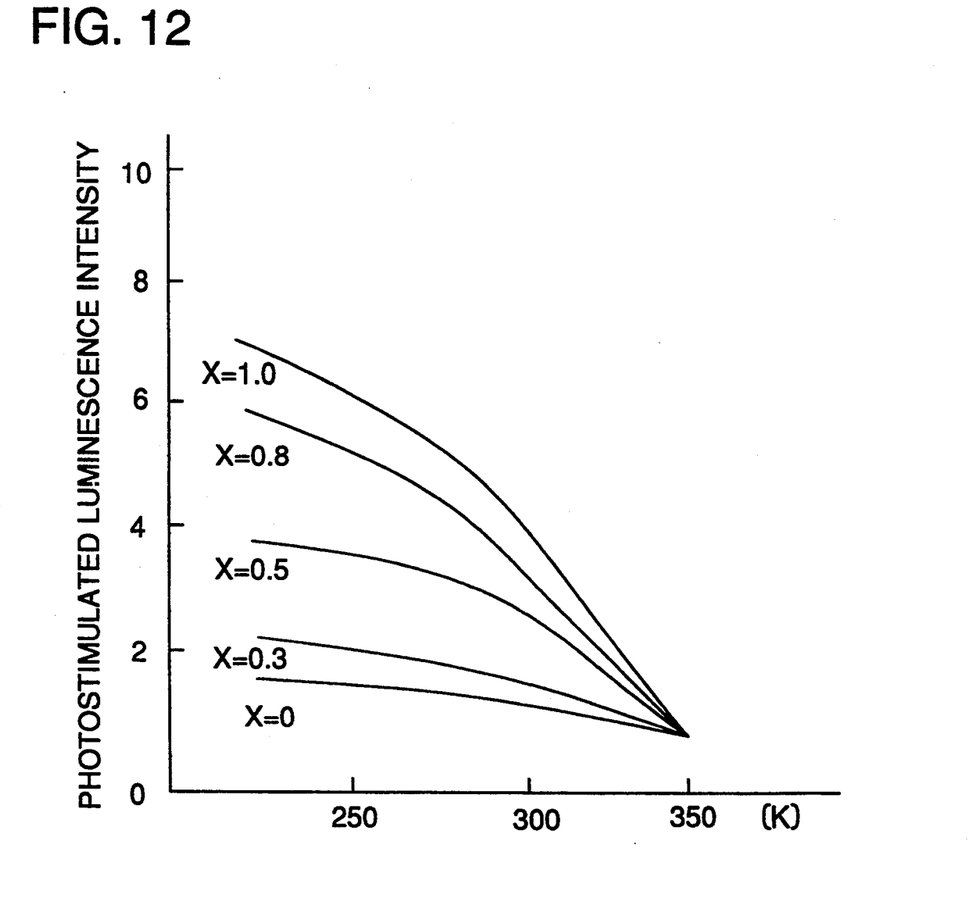
FIG. 12 is a view showing a relation between the PSL intensity of the fluorescent substances having different iodine contents and temperatures (K) in the example of the present invention.
Figure 13:
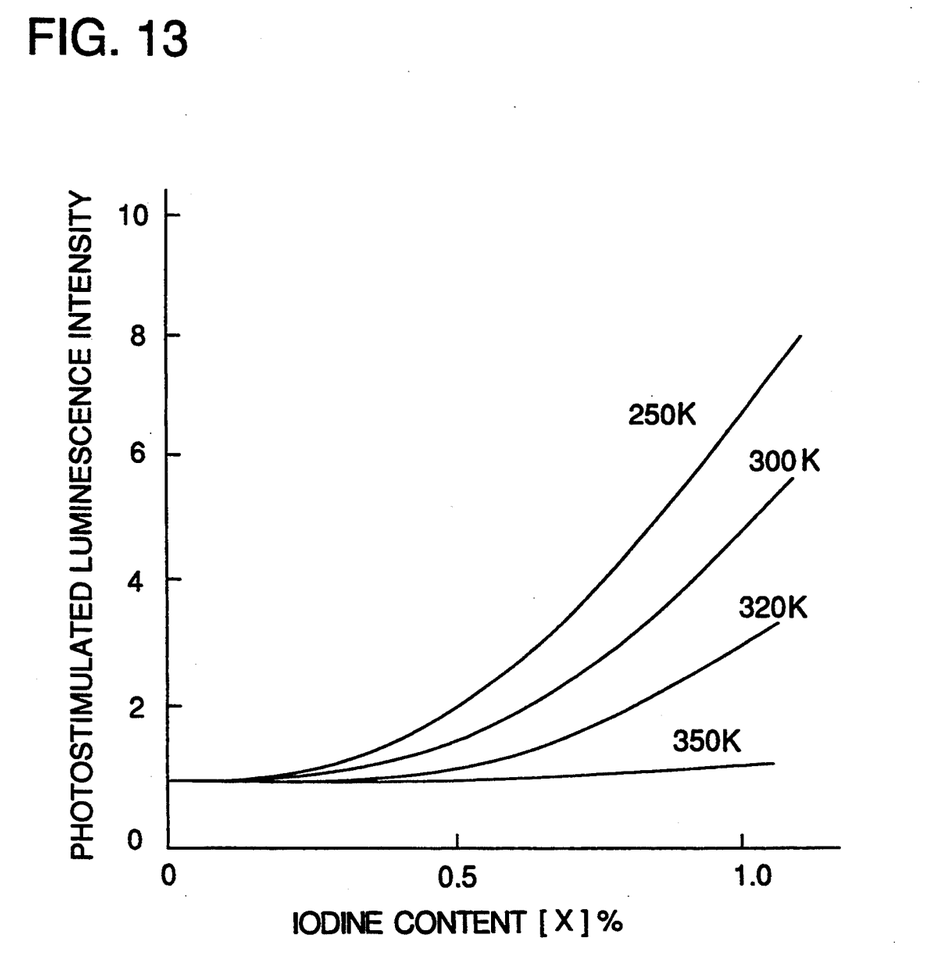
FIG. 13 is a relation between iodine content of the fluorescent substance in different temperatures (K) and the PSL intensity in the example of the present invention.

FIG. 11 to FIG. 13 show the result of measurement when $Ba.F.Br_{1-x}I_x:Eu$ (X=0, 0.2, 0.5, 0.8, 1) is used for the panel, and show the same result as that in the case of $Rb.Br_{1-x}I_x:Tl$.

The larger the value of X is, that is, the more iodine is contained, the greater the above-described effect is. Especially, the fading value is considerably small in the temperature range of 250 to 300K. The value is almost constant at the temperature below 280K.

As described above, in the present invention, the photostimulable phosphor layer is used in which a much smaller fading value and a much higher reading signal than those of other fluorescent substances can be obtained at a temperature which is not limited to an extremely low temperature. Accordingly, the present invention can provide a radiographic image reading apparatus which is highly practical and the cost of which is low and in which radiographic image information of high quality can be obtained. That is, in this apparatus, the temperature at which the conversion panel is cooled is 250 to 300K at the lowest, and there is no difficulty in the cooling technology. Further, the value of fading caused by the heat of the photostimulable phosphor can be inhibited to a much smaller value, and a much higher sensitivity than that of other photostimulable phosphor can be obtained. As a result, the apparatus according to the present invention can have an excellent effect in which the recording amounts of accumulated images can be increased.

What is claimed is:

1. An apparatus for recording and reading a radiographic image formed by exposing a subject with radioactive rays, comprising:
   a photostimulable phosphor containing at least 50 mol % iodine;
   a cooling device for cooling said photostimulable phosphor to a range of 250K to 300K to form a cooled photostimulable phosphor, wherein said cooled photostimulable phosphor is irradiated with radioactive rays so that radiographic energies corresponding to said radioactive rays are stored on said cooled photostimulable phosphor;
   a stimulator for stimulating said cooled photostimulable phosphor with an exciting light so as to cause said cooled photostimulable phosphor to emit light corresponding to said stored radiographic energies; and
   a reader for photoelectrically reading said emitted light to record the radiographic image of said subject.

2. The apparatus of claim 1 wherein said photostimulable phosphor comprises an alkali metal halide containing iodine in an amount of at least 50 mol % based on halogen.

3. The apparatus of claim 2, wherein said cooling device cools said photostimulable phosphor to a range of 270K to 300K.

4. The apparatus of claim 3, wherein said cooling device cools said photostimulable phosphor to a range of 280K to 290K.

5. The apparatus of claim 2, wherein said photostimulable phosphor is expressed by the following general expression (1):

General expression (1): $Rb.aM^1.bM^2.cM^3X_{1-x}I_x:dA$ $M^1$: at least one of the following alkaline metals: Li, Na, K, Cs $M^2$: at least one of the following metals: Be, Mg, Ca, Sr, Ba, Zn, Cd, Cu, Ni $M^3$: at least one of the following metals: Sc, Y, La, Ce, Pr, Nd, Pm, Sm, Eu, Gd, Tb, Dy, Ho, Er, Tm, Yb, Lu, Al, Ga, In X: at least one of the following halogen: F, Cl, Br A: at least one of the following metals: Eu, Tb, Ce, Tm, Dy, Pr, Ho, Nd, Yb, Er, Gd, Lu, Sm, Y, Tl, Na, Ag, Cu, Mg wherein:
$0 \leq a \leq 0.2$
$0 \leq b \leq 0.05$
$0 \leq c \leq 0.05$
$d \leq 0.1$, and $0.5 \leq x \leq 1.0$ 6. The apparatus of claim 5 wherein:
$0.8 \leq x \leq 1.0$.

7. The apparatus of claim 6 wherein said cooling device cools said photostimulable phosphor to a temperature of 280 to 290K.

8. The apparatus of claim 2, further comprising a housing with a condensation formation prevention device.

9. The apparatus of claim 2, wherein the change in the temperature of said photostimulable phosphor for the lapse of time is maintained within the range of ±3° C. of the average temperature.

10. The apparatus of claim 9, wherein the change in the temperature of said photostimulable phosphor for the lapse of time is maintained within the range of ±1° C. of the average temperature.

11. The apparatus of claim 2, wherein the difference in the temperature distribution on said photostimulable phosphor is maintained within the range of ±3° C. of the average temperature.

12. The apparatus of claim 11, wherein the difference in the temperature distribution on said photostimulable phosphor is maintained within the range of ±3° C. of the average temperature.

13. The apparatus of claim 1 wherein said photostimulable phosphor comprises an alkali earth metal fluoride halide, said alkaline earth metal fluoride halide comprising iodine in an amount of at least 50 mol % based on a total content of iodine, bromine, and chlorine, provided that said alkaline earth metal fluoride halide comprises bromine and/or chlorine.

14. The apparatus of claim 13, wherein said photostimulable phosphor is expressed by the following general expression (2):

General expression (2): $Ba.aM^2FX_{1-x}I_x:dA$ $M^2$: at least one of the following metals: Mg, Ca, Sr, Zn, Cd X: at least one of the following halogen: Cl, Br A: at least one of the following metals: Eu, Tb, Ce, Tm, Dy, Pr, Ho, Nd, Yb, Er, Gd, Sm wherein:
$0 \leq a \leq 0.5$
$d \leq 0.1$, and $0.5 \leq x \leq 1.0$ 15. The apparatus of claim 14 wherein:
$0.8 \leq x \leq 1.0$.

16. The apparatus of claim 13 wherein said cooling device cools said photostimulable phosphor to a temperature of 270 to 300K.

17. The apparatus of claim 13 further comprising a housing with a condensation formation prevention device.

18. The apparatus of claim 13 wherein a change in the temperature of said photostimulable phosphor over a lapse of time is maintained within a range of ±3° C. of the average temperature.

19. The apparatus of claim 18 wherein a change in temperature distribution on said photostimulable phosphor is maintained within a range of ±1° C. of the average temperature.

20. The apparatus of claim 13 wherein a difference in the temperature distribution on said photostimulable phosphor is maintained within a range of ±3° C. of the average temperature.

21. The apparatus of claim 13 wherein a difference in the temperature distribution on said photostimulable phosphor is maintained within the range of ±1° C. of the average temperature.

* * * * *